United States Patent [19]

Faulkner et al.

[11] Patent Number: 5,442,135

[45] Date of Patent: Aug. 15, 1995

[54] ELECTRICAL POWER DISTRIBUTION BUSWAY AND HOUSING

[75] Inventors: Nathan H. Faulkner, Pauline; Ronald D. Nordenbrock, Moore, both of S.C.

[73] Assignee: Siemens Energy & Automation, Inc., Alpharetta, Ga.

[21] Appl. No.: 37,206

[22] Filed: Mar. 25, 1993

[51] Int. Cl.⁶ .............................................. H02G 5/00
[52] U.S. Cl. ........................... 174/68.2; 174/88 B; 174/99 B; 174/72 B; 361/775; 439/212
[58] Field of Search ............... 174/68.2, 88 B, 99 B, 174/70 B, 71 B, 72 B, 133 B; 361/775; 439/207, 210, 212, 213, 214, 115, 116, 119, 114

[56] References Cited

U.S. PATENT DOCUMENTS

| | | |
|---|---|---|
| 1,967,340 | 7/1934 | Splunter . |
| 2,269,493 | 1/1942 | Thomas . |
| 2,306,353 | 12/1942 | Cole et al. . |
| 2,318,859 | 5/1943 | Huguelet ................... 174/68.2 X |
| 2,350,601 | 6/1944 | Frank et al. . |
| 2,585,770 | 2/1952 | Hammerly . |
| 2,740,429 | 4/1956 | Parks . |
| 2,881,403 | 4/1959 | Vltavsky . |
| 2,938,942 | 5/1960 | Stanback et al. . |
| 2,955,147 | 10/1960 | Carlson . |
| 2,999,219 | 9/1961 | Chase . |
| 3,015,082 | 12/1961 | Meacham . |
| 3,088,994 | 5/1963 | Cataldo . |
| 3,099,504 | 7/1963 | Rowe . |
| 3,104,276 | 9/1963 | Cataldo et al. . |
| 3,159,555 | 12/1964 | Goody . |
| 3,183,298 | 5/1965 | Weimer et al. . |
| 3,213,300 | 10/1965 | Davis . |
| 3,365,537 | 1/1968 | Fehr, Jr. et al. . |
| 3,383,458 | 5/1968 | Raskhodoff et al. . |
| 3,384,854 | 5/1968 | Jorgensen et al. . |
| 3,384,856 | 5/1968 | Fisher . |
| 3,391,378 | 7/1968 | Fisher . |
| 3,459,872 | 8/1969 | Weimer et al. . |
| 3,472,946 | 10/1969 | Vincent ............................. 174/68.2 |
| 3,504,097 | 3/1970 | Carlson . |
| 3,555,293 | 1/1971 | Shannon et al. . |

(List continued on next page.)

FOREIGN PATENT DOCUMENTS

| | | |
|---|---|---|
| 598576 | 6/1990 | Australia . |
| 0028791 | 5/1981 | European Pat. Off. . |
| 8601944 | 3/1986 | European Pat. Off. . |
| 227567A | 9/1985 | Germany . |
| 3437586A | 4/1986 | Germany . |
| 4130882 | 7/1993 | Germany . |
| 0775809 | 10/1980 | U.S.S.R. ............................. 174/68.2 |

OTHER PUBLICATIONS

International Search Report of Corresponding Application PCT/US94/02017.
Siemens Corporation Jul. 28, 1992—PC Busway—A Modular System Designed Specifically For Raised Floor Architecture.
John Fluke Mfg. Co., Inc. Jan. 1, 1992—Power Harmonics Video Ad.
Allis-Chalmers Electrical Review—Second Quarter 1963—Modern Insulation Systems Used In Bus Duct.
I-T-E- Circuit Breaker Company Jan. 22, 1962—LO-X Design.
Square D Company—I-Line II Busbar Trunking Specifiers and Contractors Guide, no date.

*Primary Examiner*—Kristine L. Kincaid
*Assistant Examiner*—L. Thomas

[57] ABSTRACT

An electrical power distribution busway system which includes a housing having side channels and top and bottom channels is described. The channels enclose and secure at least one stack of conductive busbars in place. At least one of the top or bottom housing channels is adjustably mounted between the side channels so the overall housing may be adjusted to accommodate various arrangements of busbars or busbars having different thicknesses. In a preferred form of the invention, the adjustable channels include holes which are aligned with elongate slots through the side channels. Fasteners extending through the aligned holes and slots allow the adjustable channel to be moved and fixed at different locations along the elongate slot.

8 Claims, 11 Drawing Sheets

U.S. PATENT DOCUMENTS

| | | |
|---|---|---|
| 3,584,138 | 6/1971 | Pritzen, Jr. . |
| 3,636,237 | 1/1972 | Hafer |
| 3,639,676 | 2/1972 | Dempsey, Jr. et al. ............ 174/68.2 |
| 3,647,937 | 3/1972 | Jorgensen . |
| 3,683,313 | 8/1972 | Weimer et al. . |
| 3,730,971 | 5/1973 | Durham et al. ..................... 174/68.2 |
| 3,744,002 | 7/1973 | Weimer et al. . |
| 3,786,394 | 1/1974 | Koenig et al. . |
| 3,922,053 | 11/1975 | Hafer . |
| 3,956,574 | 5/1976 | Weimer ............................... 174/68.2 |
| 4,008,365 | 2/1977 | Carlson .............................. 174/68.2 |
| 4,009,920 | 3/1977 | Hicks, Jr. et al. . |
| 4,082,393 | 4/1978 | Gamble . |
| 4,112,249 | 9/1978 | Carlson . |
| 4,146,285 | 3/1979 | Cook . |
| 4,174,143 | 11/1979 | Hicks, Jr. et al. . |
| 4,213,003 | 7/1980 | Carlson . |
| 4,627,680 | 12/1986 | Weimer et al. . |
| 4,668,031 | 5/1987 | Dumontet et al. . |
| 4,673,229 | 6/1987 | Jorgensen et al. ................... 439/207 |
| 4,705,334 | 11/1987 | Slicer et al. . |
| 4,705,480 | 11/1987 | Dumontet et al. . |
| 4,714,431 | 12/1987 | McGoldrick et al. . |
| 4,735,577 | 4/1988 | Munroe et al. . |
| 4,758,172 | 7/1988 | Richards et al. . |
| 4,781,609 | 11/1988 | Wilson et al. . |
| 4,804,804 | 2/1989 | Hibbert et al. .................. 174/68.2 X |
| 4,820,178 | 4/1989 | Anderson et al. . |
| 4,842,533 | 6/1989 | Beberman et al. . |
| 4,849,581 | 7/1989 | Larkin et al. . |
| 4,886,468 | 12/1989 | Harton et al. . |
| 4,886,940 | 12/1989 | Gagnon et al. . |
| 4,929,801 | 5/1990 | Hibbert . |
| 4,945,188 | 7/1990 | Jackson ......................... 174/68.2 X |
| 4,950,841 | 8/1990 | Walker et al. . |
| 4,952,164 | 8/1990 | Weber et al. . |
| 4,957,447 | 9/1990 | Hibbert et al. . |
| 5,067,907 | 11/1991 | Shotey . |
| 5,068,763 | 11/1991 | Brown et al. . |
| 5,151,043 | 9/1992 | Morgan . |
| 5,162,616 | 11/1992 | Swaffield et al. . |

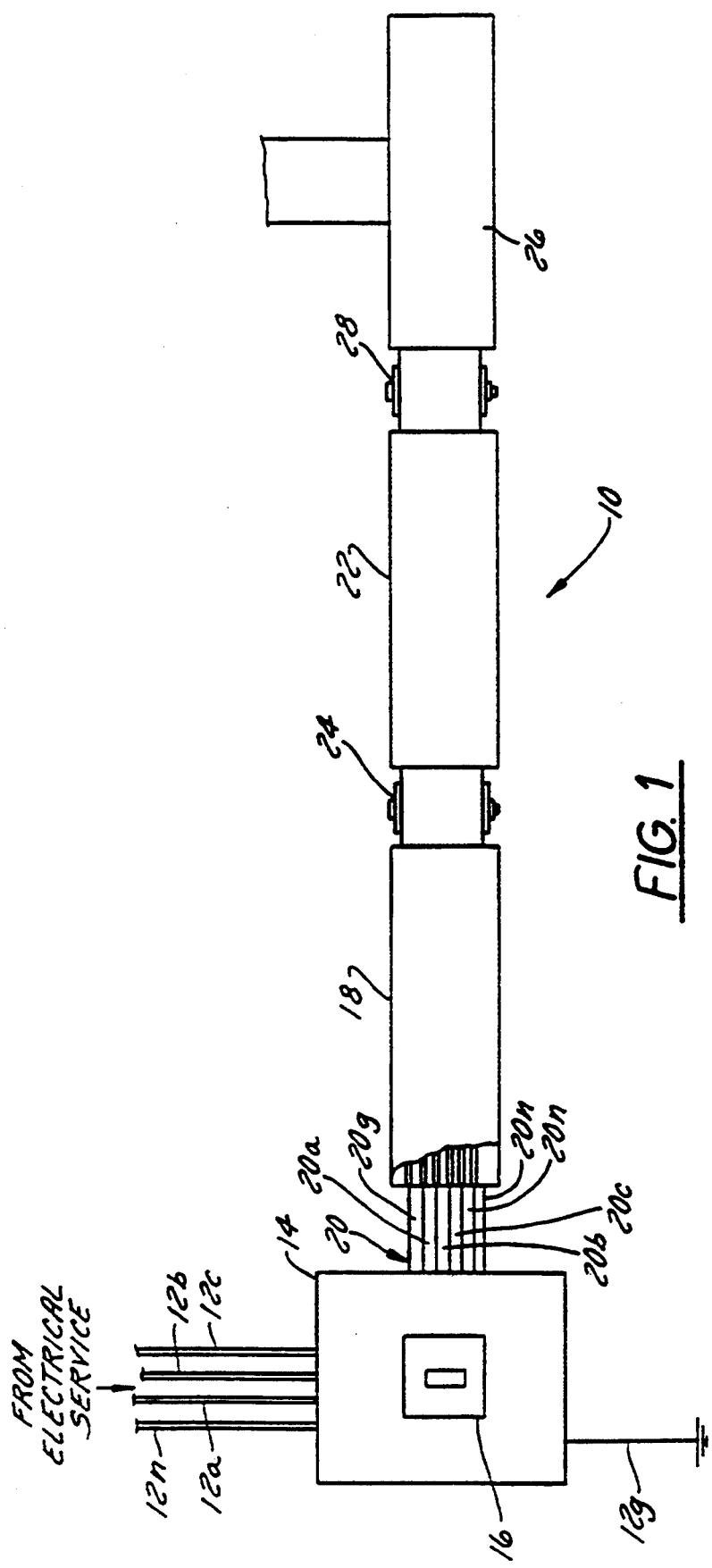

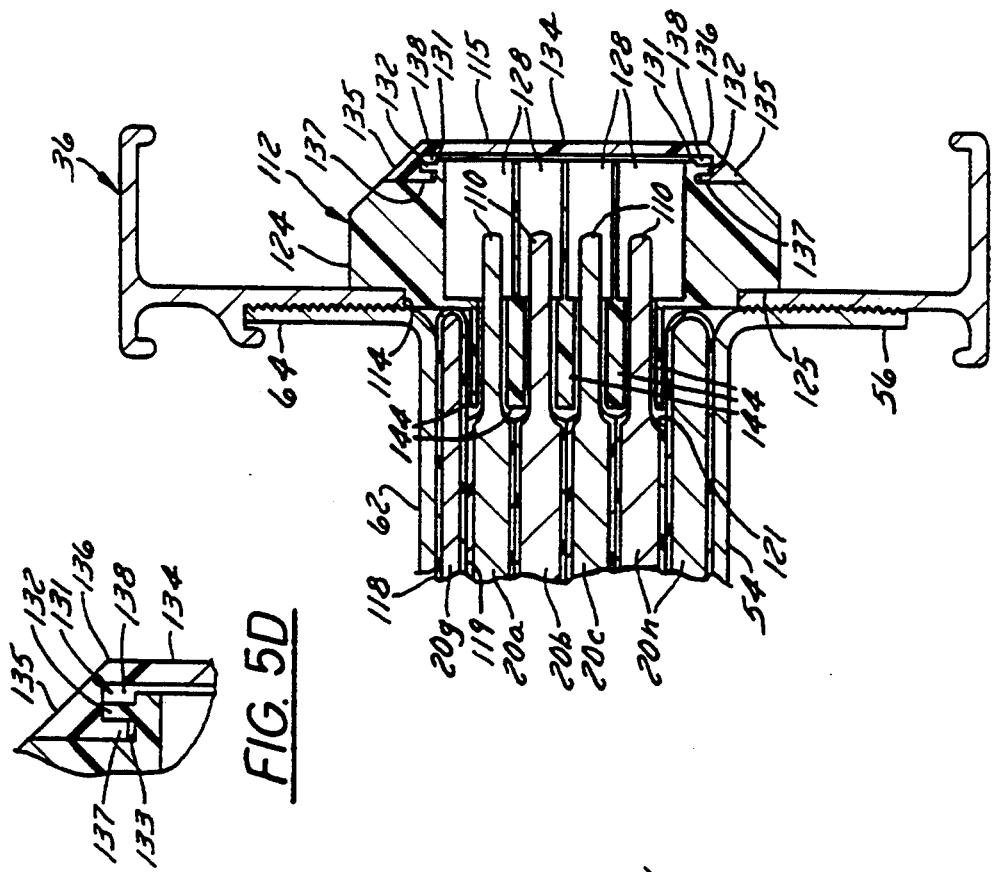
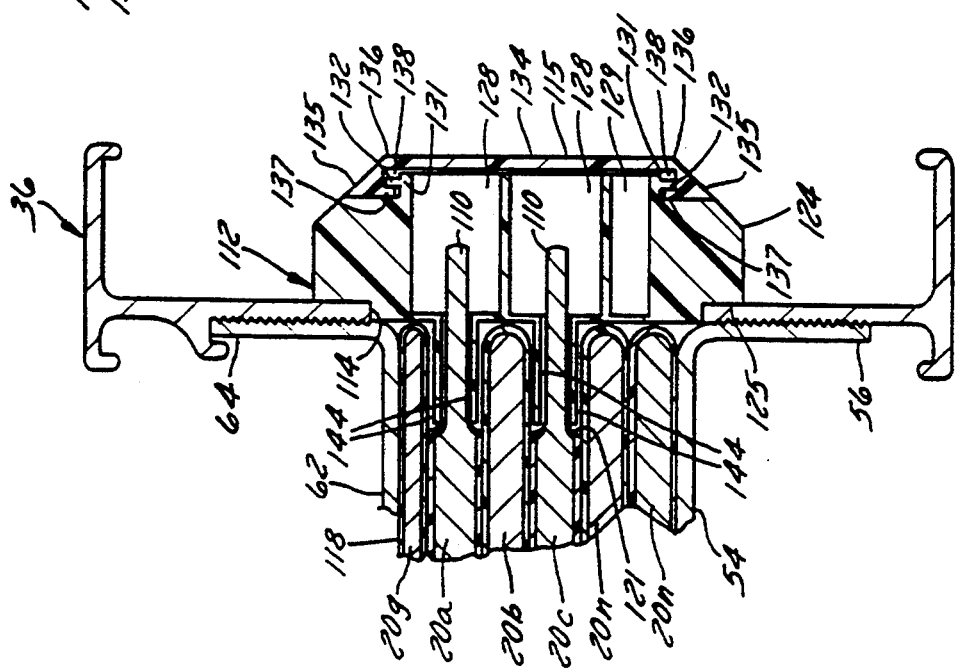

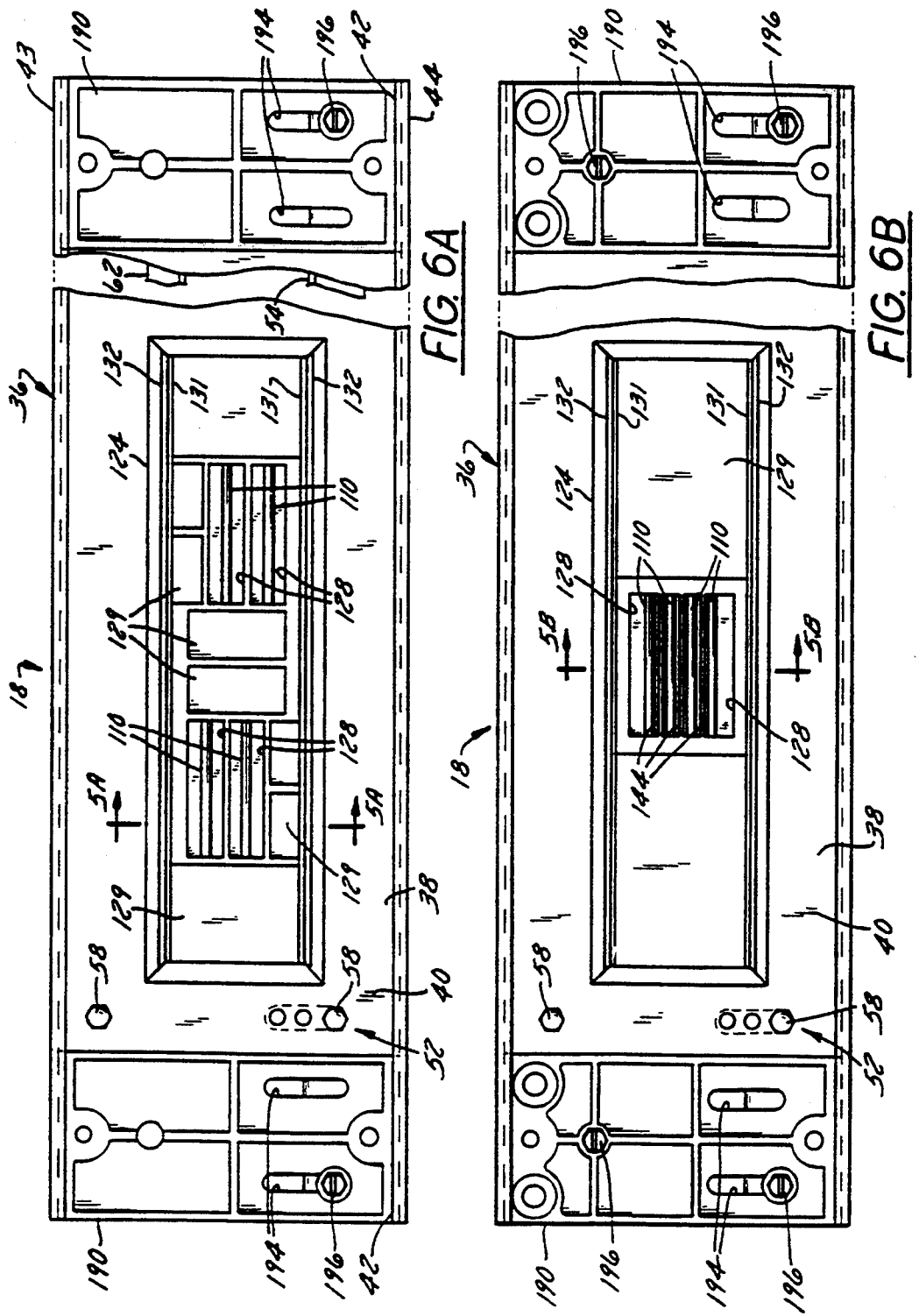

ELECTRICAL POWER DISTRIBUTION BUSWAY AND HOUSING

TECHNICAL FIELD

The present invention relates generally to an electrical power distribution busway, and more particularly to a busway and busway housing which may be efficiently manufactured and assembled.

BACKGROUND OF THE INVENTION

Electrical power distribution busway housings are used to enclose and support electrically conductive busbars in a power distribution busway system. Typically, the busway housing includes a pair of opposed walls which extend longitudinally generally parallel to one another. A second pair of walls also extend longitudinally and generally parallel to one another but perpendicular to the first pair of opposed walls. This creates a four sided structure for containing the electrically conductive busbars.

The walls of the second pair often include extensions which extend perpendicularly therefrom to create a generally U-shaped channel. The extensions are disposed adjacent the first pair of walls for attachment thereto by welding or other appropriate methods of fastening. However, this type of housing is problematic since it is of a fixed size. In other words, the housing is designed to accommodate one configuration of busbars, where other configurations require a separate housing of different proportions.

Other types of busway housings are formed of sheet steel appropriately bent to provide the housing with a generally rectangular cross-section. The sheet steel is formed into two generally U-shaped sections which are affixed together, usually by welding, to provide top, bottom and side walls. Often the top and bottom walls are formed to include small channels that add structural rigidity. As with the housing discussed above, this type of housing is problematic since it lacks adjustability. Also, this type of housing generally does not include integral mounting flanges for mounting the power distribution busway in the floors or ceilings of a facility.

Still other power distribution systems use busways having a top channel and a bottom channel disposed on the top and bottom of a stack of electrically conductive busbars, respectively. Such channels typically include flanges disposed outwardly from the busbar stack to facilitate attachment of the top channel to the bottom channel or attachment of the housing at a particular location. The channel sections are appropriately sized so the top and bottom channels are brought into mating engagement with each other when tightened about a particular stack of busbars. Usually the channel sections are attached to one another by fasteners, such as bolts, that extend directly through the stack of busbars or through flanges which extend outwardly from the busbar stack from each channel section. This type of housing is also limited to a single busbar stack configuration having a stack of conductive busbars appropriately sized to fit within the preformed channel sections.

Accordingly, it would be advantageous to provide a busway housing with one set of components which are configurable to accept various busbar stack configurations.

SUMMARY OF THE INVENTION

The present invention provides for an electrical busway and busway housing. More specifically, there is provided a busway housing including a pair of side plates, and top and bottom channels. The side plates and channels are configured such that either one or both of the channels are adjustably mounted between the side plates. The provision of at least an adjustably mounted channel permits a given side plate and channel configuration to support and contain varying numbers and thicknesses of busbars. Additionally, the adjustability allows the busbars in the busway to be held firmly between the channels.

BRIEF DESCRIPTION OF THE DRAWINGS

The invention will hereafter be described with reference to the accompanying drawings, wherein like numerals denote like elements, and:

FIG. 1 is a schematic view of an electrical power distribution busway system;

FIG. 5A is a partial cross-sectional view taken along lines 5A—5A of FIG. 6A illustrating the relationship of staggered plug-in tabs, housing, and insulator assembly;

FIG. 5B is a partial cross-sectional view taken along lines 5B—5B of FIG. 6B illustrating the relationship of stacked plug-in tabs, housing, and insulator assembly;

FIG. 5D is an exploded view of a portion of the insulator assembly;

FIG. 6A is a side view of the insulator assembly used with staggered plug-in tabs;

FIG. 6B is a side view of the insulator assembly used with the stacked configuration of plug-in tabs;

DETAILED DESCRIPTION OF THE PREFERRED EMBODIMENTS

Figure 2A:
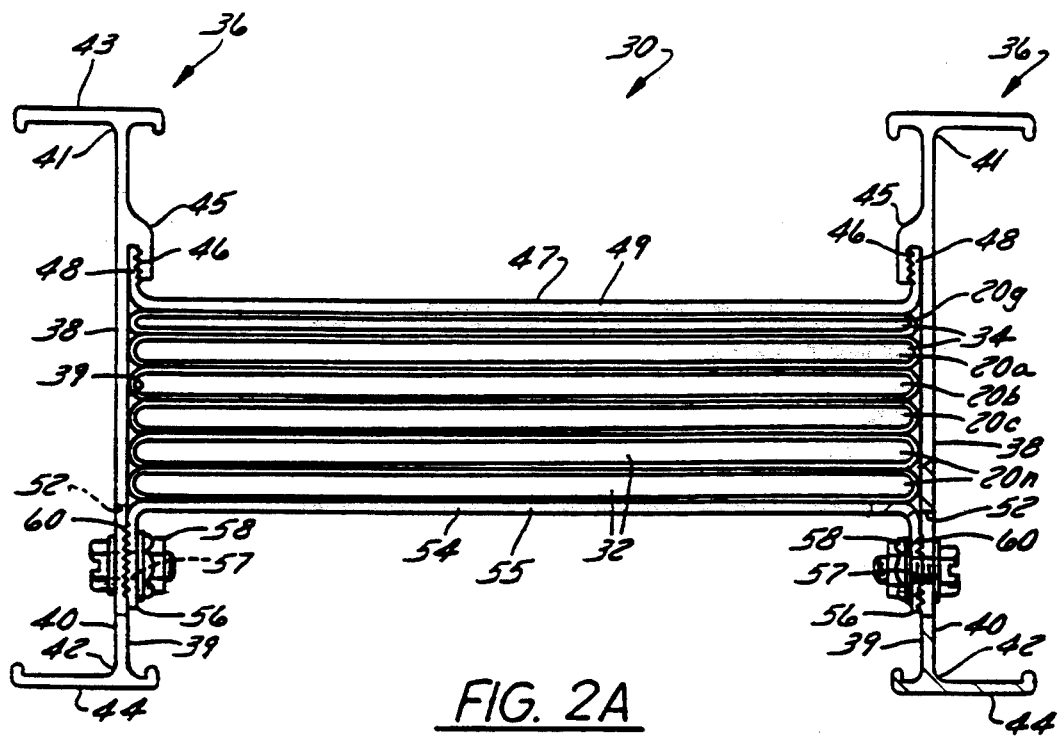
FIG. 2A is an end view of a busway illustrating a stack of busbars contained in an adjustable housing.
Figure 2B:
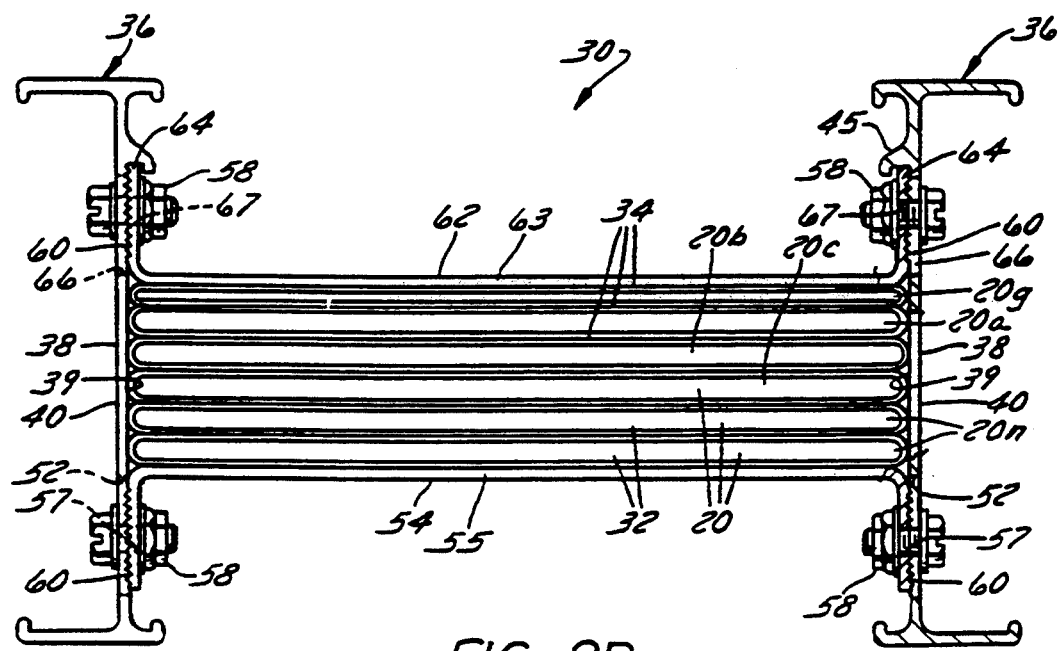
FIG. 2B is an end view of a busway illustrating an alternate embodiment of an adjustable housing.

Referring to FIG. 1, an electrical power distribution system designated generally as 10 is shown schematically. Conductors 12a, 12b, 12c, 12n and 12g deliver three-phase power from a source (electrical service not shown) to a load center 14 which includes a circuit breaker 16. A first busway section 18 includes a plurality of conductive busbars 20 (20a, 20b, 20c, 20n, 20g) coupled to circuit breaker 16. The busbars 20 are shown extending from the partially cut away portion of busway section 18, but normally the busbars are enclosed. Various combinations of busbars 20 comprising phase busbars 20a, 20b, 20c (phases A, B, C), ground busbars (20g), and neutral busbars 20n may be used, depending upon the application. In the embodiment of FIG. 1, busbar 20a is the A-phase busbar, busbar 20b is the B-phase busbar, busbar 20c is the C-phase busbar, busbar 20n is the neutral busbar, and the second busbar 20n is a second neutral busbar which is optional, depending upon the application. Each of busbars 20a, 20b, 20c, 20n and 20g have a substantially rectangular cross-section which may have rounded corners as shown in FIGS. 2A and 2B. For typical applications, busbars 20a, 20b, 20c, 20n and 20g are configured to carry between 225 and 6500 amperes of current at potentials ranging from 100 to 700 volts. More specifically, this configuration requires the busbars to have a cross-sectional size large enough and of the appropriate size to carry these currents at these potentials without developing a heating problem.

Referring once again to FIG. 1, a second busway section 22 is connected to first busway section 18 by a busway joint 24. A third busway section 26 is a T-section for routing electricity in two directions and is connected to the second busway section 22 by another busway joint 28. By way of further modification, the configuration of busway sections 18, 22 and 26 may be modified for use with single phase power.

The embodiment of the busway system shown in FIG. 1 conducts electrical power to a variety of locations. The busway sections can be affixed along a floor, ceiling or wall and may easily be extended to a required length by attaching additional busway sections with additional busway joints. The busway system may also incorporate T-sections or other split sections to direct electrical power in varying directions. Power tap-off sections (discussed below) provide areas of access to the electrical power in the busway so motors, electric motor drives, power supplies, computers, printers, medical equipment, lights, etc. may readily be connected to the electrical power source.

Referring now to FIG. 2A, a cross-sectional view of a busway section is shown. Busbars 20g, 20a–c, 20n are stacked together and contained by a busway housing 30. Each busbar includes a bar of conductive material 32, typically made from aluminum or copper, coated with an insulating layer 34. The insulating layer 34 may be made from a variety of insulative materials such as epoxy or other appropriate thermoset or thermoplastic materials. Insulating layer 34 on each busbar 20 is found to prevent electrical contact or arcing between the busbars.

Two or more neutral busbars 20n may be provided where the loads to which the busway is providing power have substantially non-linear components. By providing least two neutral busbars 20n having a total cross-sectional area greater than that of each phase busbar 20a–30c, busbars 20n are capable of carrying the increased currents occurring in busbars 20n as a result of additive harmonic currents caused by the non-linear loads. Since the present embodiment utilizes busbars all having substantially the same width, the combined thickness of busbars 20n is greater than the thickness of each phase busbar 20a–20c.

Since the current carrying capacity of a conductor is affected by both its cross-sectional area and the phenomena of skin effect, it may not be satisfactory to only increase the number of neutral busbars 20n for the purpose of reducing ohmic heating which results from increased currents due to non-linear loads. More specifically, the neutral busbars should be configured to provide the maximum reasonable ratio of the busbar cross-section perimeter to cross-section area. By appropriately maximizing this ratio, the reductions in current carrying capacity caused by the skin effect can be minimized.

Accordingly, by providing busbars 20n with a rectangular cross-section having an appropriate width-to-thickness ratio, an appropriate perimeter-to-area ratio can be achieved. More specifically, a width-to-thickness ratio greater than 5 to 1 is desirable. In the preferred embodiment, busbars 20n have a width-to-thickness ratio of about 15 to 1, and have a total cross-sectional area which is about two times the area of a phase conductor 20a–20c. When configuring for a particular application, the width is varied depending upon the amperage for which a particular busway section 18 is designed to carry.

Busway housing 30 includes a pair of side channels 36, a top housing channel 47 and a bottom housing channel 54. Channels 36, 47 and 54 are joined to enclose and hold the stack of busbars within housing 30. Each side channel 36 includes a side plate 38 having an inside surface 39, an outside surface 40, a top edge 41 and a bottom edge 42. An upper flange 43 is disposed at top edge 41 generally perpendicular to side plate portion 38. Similarly, a lower flange 44 is disposed at bottom edge 42 generally perpendicular to the side plate portion 38. Flanges 43 and 44 may comprise a variety of configurations and may be disposed at various angles relative to the side plates 38 depending on the particular power distribution busway application. Flanges 43 and 44 provide a structure at which the busway may be supported, and also provide a structure which facilitates the dissipation of heat generated within the busway. More specifically, flanges 43 and 44 provide additional surface area for radiating and conducting heat from the busway.

Each side plate 38 further includes a hook formation 45 extending from inside surface 39. Hook 45 preferably extends downwardly towards bottom edge 42 and may include a gripping structure such as teeth or a roughened surface 46 disposed on the inside of the hook (see FIG. 5E). Each hook 45 is configured to receive one of a pair of legs 48 from top housing channel 47. Where gripping elements 46 are used, these elements assist in maintaining engagement between hooks 45 and legs 48. A planar member 49 extending between legs 48 gives channel 47 a generally U-shaped cross-section. Preferably, legs 48 extend upwardly into the hook 45 and planar member 49 provides a support against which the stack of busbars 20 is pressed when secured in busway housing 30.

Each side plate 38 also includes a series of holes or elongate slots at the location labeled 52. The holes or slots extend through plates 38 (also see FIG. 6A). The holes or slots may be spaced along the length of each side plate 38 with at least one located at each end of a busway section. The slots, when used, extend vertically toward hook 45. The use of holes or slots at locations 52 depends upon the application. The use of slots provides a great degree of flexibility in changing the location of channels 47 and 54. However, for high amperage applications, the blow apart forces may slide channels 47 and 54 apart even in the presence of gripping elements 46. Accordingly, for certain applications, a plurality of holes which are selectable for use, depending upon the distance required between channels 47 and 54, are used in place of the slots.

Bottom housing channel 54 is adjustably mounted between side plates 38 and is disposed to hold busbars 20 against the bottom of channel 47. More specifically, rather than forming channel 54 in place, or configuring the side plates 38 to only accept channel 54 at one position, the bottom housing channel 54 may be adjusted towards or away from the top housing channel 47 to accommodate different numbers of busbars or busbars having different thicknesses. This arrangement permits adjustment of channel 54 rather than an essentially stationary channel. Channel 54 is simply adjusted upwards along the slots, or by selecting an appropriate hole, at location 52 until the busbars are secured between the top and bottom housing channels.

Bottom housing channel 54 is generally U-shaped and has a planar member 55 separating a pair of legs 56. Each of the legs includes holes 57 which each overlay a portion of one slot 52. Planar member 55 is configured to contact the bottom of the busbar stack and legs 56 extend downwardly so that holes 57 are aligned with elongate slots 52. A fastener 58, e.g. a bolt and nut, extends through each hole or elongate slot at location 52 and its corresponding hole 57. When housing channels 47 and 54 are properly adjusted, fasteners 58 are tightened to provide busway housing 30 with the desired dimensions for securely containing busbars 20.

By way of example, channels 47 and 54 may be fabricated from sheet aluminum to a width corresponding to the width of associated busbars 20.

Figure 5C:
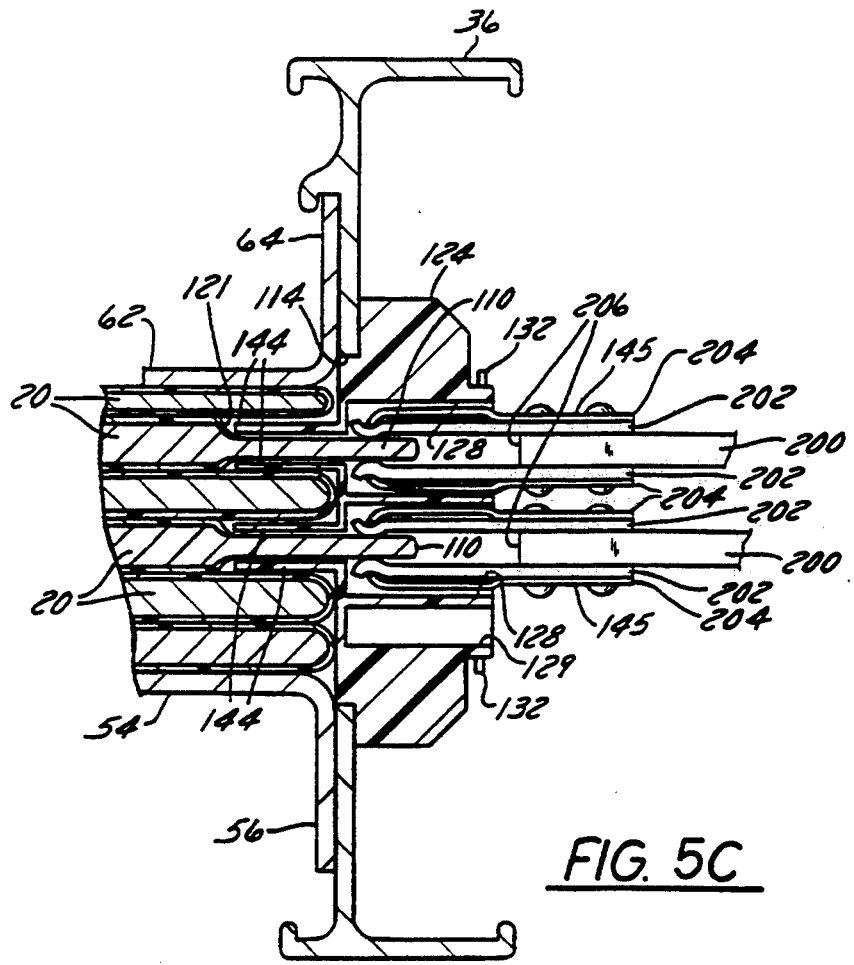
FIG. 5C shows the plug-in tabs connected to typical contacts of a plug connector.
Figure 5E:
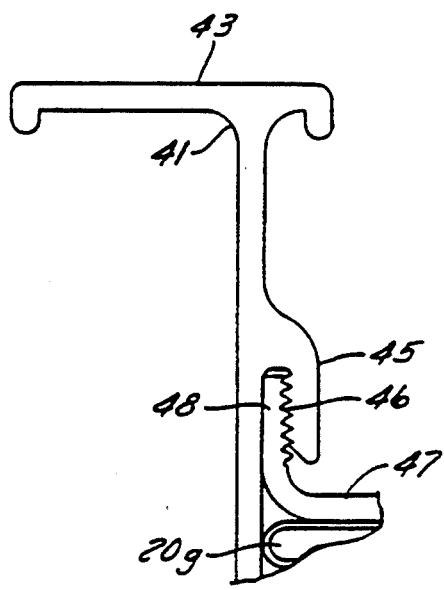
FIGS. 5E and 5F are exploded views of portions of the busway housing.
Figure 5F:
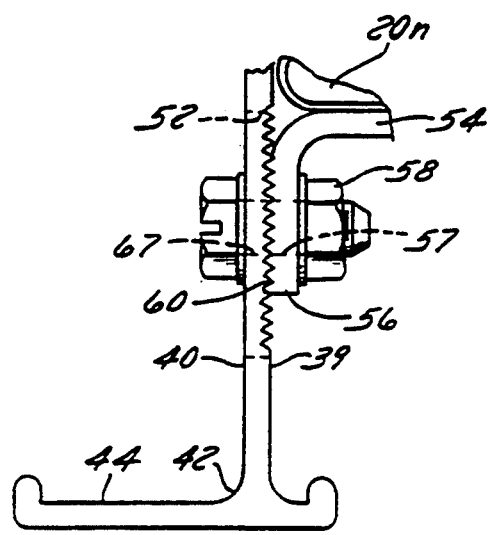

By way of modification, a gripping structure 60 may be disposed between bottom channel legs 56 and the inside surfaces 39 of side plates 38 to further prevent movement of bottom housing channel 54 once fasteners 58 are tightened (see FIG. 5F). This may be important for busways carrying high currents which produce large blow-apart forces between the busbars. Gripping structure 60 may include for example lock washers, adhesive, resilient washers, or roughened surfaces, but preferably comprises a series of teeth formed in the side plates 38 at the points of connection between the members. Thus, when each fastener 58 is tightened, bottom housing channel 54 will be securely held in engagement with the teeth on the side plate 38.

In one embodiment, side plates 38 may be fabricated from extruded aluminum. In this embodiment, when elements 46 and 60 are teeth, the teeth are readily formed during the extrusion process. In addition to the functions described above, the teeth also serve to cut through paint and surface materials on channels 47 and 54 to provide electrical continuity between plates 38 and channels 47 and 54. Furthermore, the engagement of the teeth with channels 47 and 58 provides a waterproof seal between channels 47 and 54, and plates 38.

The present embodiment of the busway may provide a cost effective system for producing busways of different ratings from some parts common to all ratings. More specifically, one size of plates 38 may be used for a range of ratings by varying the width of channels 47 and 54, and busbars 20.

By way of modification, there may be applications where the busway housing would be constructed with a pair of nested channels 47 and 54. In this configuration, one of the channels would be fabricated with channel legs having a spacing and length suitable to allow the channels to be nested and joined (bolted) together at their legs. This configuration also allows selective spacing of the channels to accommodate varying numbers of busbars and thicknesses of busbars while also providing a complete enclosure for the busbars. More specifically, the legs would include mating holes associated with multiple spacing distances, or hole and slot configurations to permit multiple spacing distances, or hole and slot configurations to permit multiple spacing distances. As an alternative to joining the channels at the legs to secure the channels and busbars together, bolts could be used to pass through the busbars and channels such that the channels and busbars are secured together.

In a modified embodiment of FIG. 2A, shown generally in FIG. 2B, housing 30 includes an adjustable top housing channel 62 which preferably has the same configuration as bottom housing channel 54. Adjustable top channel 62 includes a planar member 63 extending between a pair of legs 64 which extend upwardly along side plates 38. Also, in this embodiment, side plates 38 include holes or elongate slots at locations 66 (FIG. 7B) disposed above location 52 for cooperation with a plurality of holes 67 extending through legs 64. Each hole 67 is aligned with a hole or an upper elongate slot at location 66. A fastener 58 extends through each hole or upper elongate slot 66 and its corresponding hole 67 and, as with bottom housing channel 54, a gripping structure 60 is disposed at the interface between each leg 64 and the adjacent side plate 38. Additionally, the hook portion 45 has a looser fit since it no longer needs to hold the top housing channel at a fixed location. Hook 45 could be eliminated, but it is preferably left attached to each side plate 38 to act as a stop or brace against which top housing channel 62 abuts when adjusted to its extreme outward position.

Figure 3A:
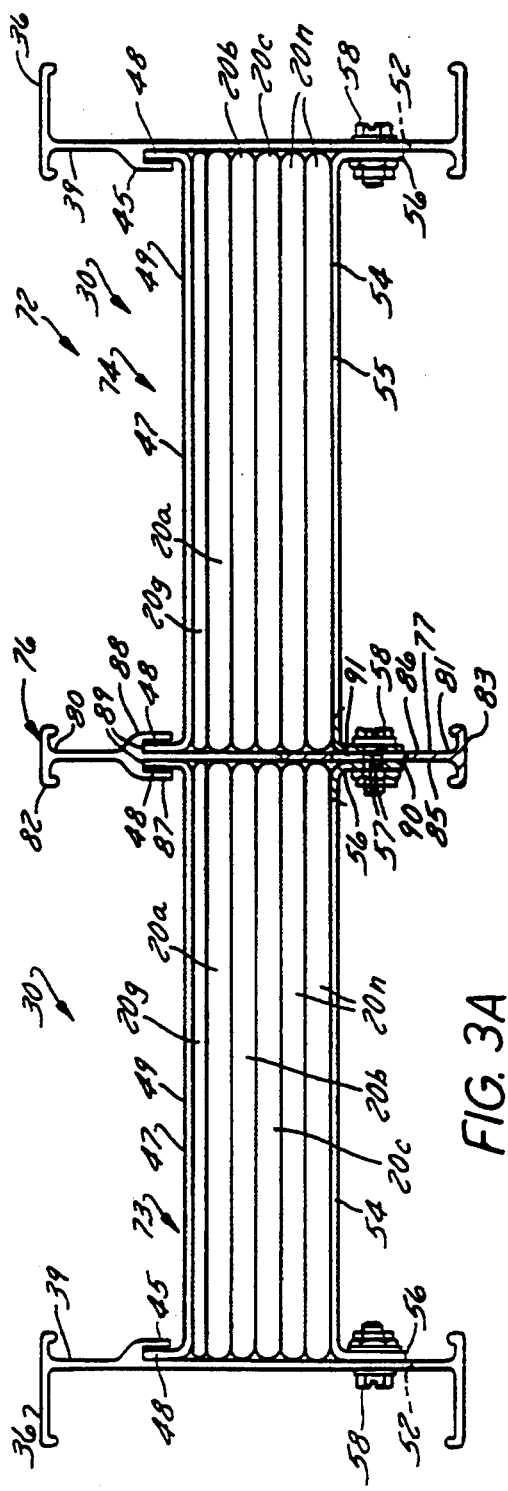
FIG. 3A is an end view illustrating an adjustable housing for containing a plurality of busbar stacks.
Figure 3B:
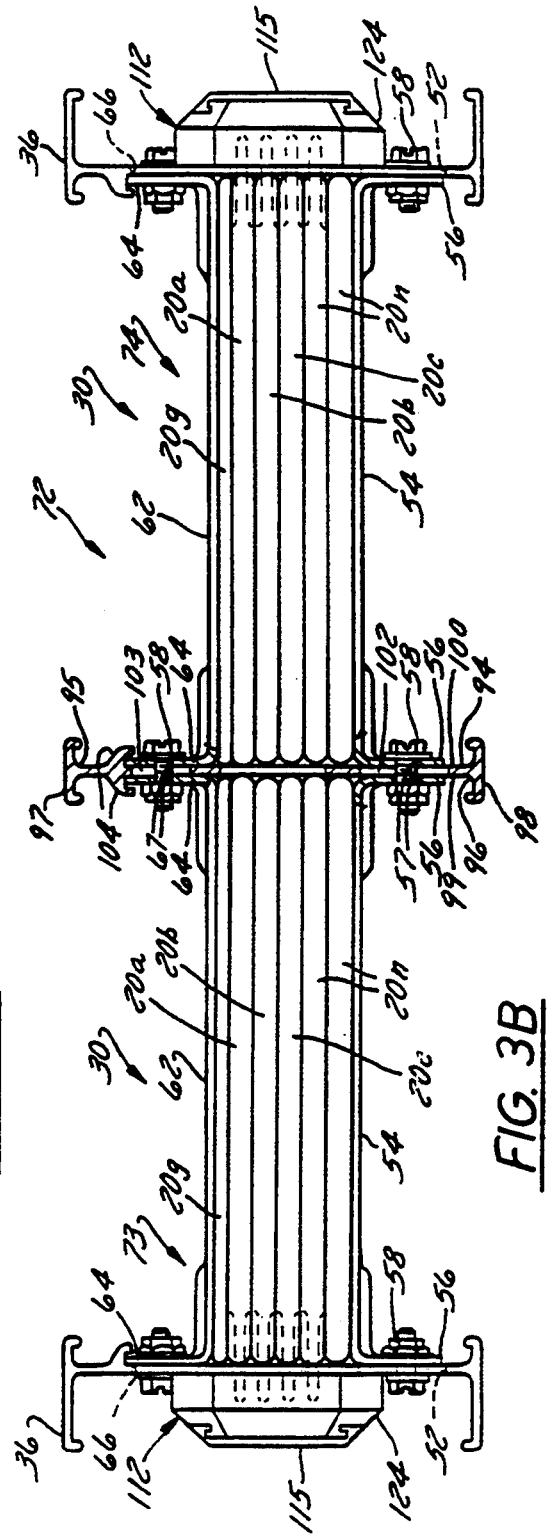
FIG. 3B is an end view illustrating an alternate embodiment of an adjustable housing for containing a plurality of busbar stacks.

In another embodiment, illustrated in FIGS. 3A and 3B, busway housing 30 is modified to accommodate multiple stacks of busbars arranged in a side-by-side relationship. In certain electrical power distribution busway systems, it may be advantageous to use multiple parallel sections of busway, where each section encloses a separate stack of busbars. The busway housings illustrated in FIGS. 3A and 3B can securely enclose two parallel stacks of busbars and could be expanded to accommodate additional stacks of busbars as will be explained below.

In the embodiment shown in FIG. 3A, housing 30 includes a first housing portion 73 and a second housing portion 74, with each portion enclosing a separate stack of busbars 20. The two stacks of busbars are separated by a center rail 76 which is generally in parallel alignment with side channels 36 disposed at the outer sides of the busbar stacks. Side channels 36 are preferably the same as side channels 36 described with reference to FIG. 2A.

Center rail 76 includes a planar portion 77 separating the busbar stacks, an upper end 80 and a lower end 81. An upper flange 82 is affixed to upper end 80 generally perpendicular to planar portion 77. Similarly, a lower flange 83 is affixed to lower end 81 generally perpendicular to planar portion 77. As with the side channels 36, the specific configuration of flanges 82 and 83, as well as their orientation with respect to planar portion 77, may be adapted according to the specific mounting requirements of the electric power distribution busway system 10.

Planar portion 77 includes a first surface 85 facing towards first portion 73 and a second surface 86 facing towards the second portion 74 of housing 30. A hook 87 extends from first surface 85 and a hook 88 extends from second surface 86. Each of the hooks includes a gripping structure 89, preferably teeth formed in the inner surface of each hook. A pair of top housing channels 47 are received in hooks 87 and 88, respectively, and held at a fixed location. Housing channels 47 are preferably of the same configuration as top housing channel 47 shown in FIG. 2A and are disposed in first portion 73 and second portion 74, respectively. Each top housing channel 47 includes planar portion 49 configured to contact the top of a busbar stack secured within housing portion 73 or 74. The legs 48 of one top housing channel 47 are received in hook portion 87 and hook portion 45 of outside channel 36. Similarly, legs 48 of the other top housing channel 47 are received in hook portion 88 and hook portion 45 of its respective outside channel 36.

Center rail 76 further includes a plurality of holes or elongate slots at location 90 extending through planar portion 77. The holes or slots are generally aligned with the holes or slots in outside channels 36. Thus, a pair of bottom housing channels 54 may be adjustably mounted in first portion 73 and second portion 74 of housing 72. The legs 56 of one bottom housing channel 54 are adjacent the inside surface 39 of side channel 36 and the first surface 85 of center rail 76, respectively. Similarly, the legs of the adjacent bottom housing channel 54 are disposed adjacent inside surface 39 of the opposite side channel 36 and the second surface 86 of center rail 76, respectively. Fasteners 58 extend through holes 57 and the associated holes or slots to connect bottom housing channels 54, side channels 36, and center rail 76.

A pair of gripping structures 91 are disposed between first surface 85 and its adjacent leg 56 and between second surface 86 and its adjacent leg 56 at each connection point. Although various gripping elements may be used, gripping structures 91 preferably comprise a series of teeth formed in first surface 85 and second surface 86, which intermesh with the teeth of legs 56.

Another alternate embodiment of housing 30 is illustrated generally in FIG. 3B. In this embodiment, housing 30 once again includes two portions 73 and 74 separated by a center rail 93. The housing 30 is bounded at its sides by side channels 36, which have the same configuration as those described with general reference to FIG. 2B. This multiple housing configuration is similar to the multiple housing configuration described above, but it includes a pair of adjustable top housing channels 62 in addition to the adjustable bottom housing channels 54. Each housing portion, 73 and 74, respectively, includes an adjustable upper channel 62 and an adjustable bottom housing channel 54. These channels may be adjusted towards and away from one another.

Housing portions 73 and 74 are separated by center rail 93 which includes a planar portion 94 having an upper end 95 and a lower end 96. An upper flange 97 is affixed at upper edge 95 generally perpendicular to planar portion 94. Similarly, a lower flange 98 is affixed to lower edge 96 generally perpendicular to planar portion 94. Planar portion 94 includes a first surface 99 facing first housing portion 73 and a second surface 100 facing second housing portion 74.

A plurality of lower holes or elongate slots at location 102 extend through planar portion 94 in general alignment with holes or elongate slots at location 52 of outside channels 36. One leg 56 of each bottom housing channel 54 is disposed adjacent first surface 99 and second surface 100, respectively. They are connected to center rail 93 by a fastener 58, which preferably extends through the holes 57 aligned with each lower hole or elongate slot at location 102. Similarly, planar portion 94 includes a plurality of upper holes or elongate slots at location 103 extending therethrough in general alignment with upper holes or elongate slots at location 66 of side channels 36. The legs 64 of each top housing channel 62 adjacent first surface 99 and second surface 100, respectively, are connected to center rail 93 by one of the fasteners 58. Preferably, the fastener extends through the holes 67 aligned with each associated hole or elongate slot. When the fasteners 58 connecting the top and bottom channels to the side channels and center rail are loosened, the upper housing channels 62 and lower housing channels 54 can be adjusted towards or away from one another.

As illustrated in FIG. 3B, center rail 93 also includes a pair of hook portions 104 for receiving legs 64 of the adjustable top housing channel 62. Since, in this embodiment the top housing channels 62 are adjustable, hooks 104 do not necessarily function to fix the location of the top housing channels. Rather, hooks 104 act as stops which prevent further outward adjustment of upper channels 62.

The number of parallel stacks of busbars 20 contained in housing 30 may be further increased by using additional center rails 76 or 93. Each additional parallel center rail would require another top and bottom housing for containing an additional parallel stack of busbars. Such a multiple housing would be fastened together as described above with reference to FIGS. 3A and 3B.

In the presently preferred embodiment, the cross-sections of channels 36, and rails 76 or 93 are uniform along their lengths. By maintaining this uniformity, channels 36, and rails 76 or 93 may, as discussed above, be extruded from a suitable material such as aluminum. However, as codes and materials change, other extrudable materials such as plastics may provide suitable alternatives for aluminum.

For certain applications, it may be necessary to completely or substantially seal busway housings 30. This may be accomplished by using an adhesive or suitable sealant (e.g. silicone based sealants) at the interfaces between channels and rails of housings 30. Additionally, depending upon the anticipated blow-apart forces which will occur between the busbars 20, busbars 20 may be taped together before installation in the housing, or a bolt may be passed through housing 30 and busbars 20. By way of further modification, it may be useful in some applications to configure the channels and rails of housing 30 to permit assembly of housing 30 with busbars 20 rotated 90° from their orientation as described above.

In an electrical power distribution busway system, it is necessary to provide power tap-off sections which allow access to the conductive busbars for connecting machines, light systems and other devices requiring electrical power. Typically, this is accomplished by exposing the busbars through an opening in the busway housing and corresponding openings in an insulator assembly adjacent to busbars 20. Busbars 20 may include plug-in tabs configured for engagement with a plug connector through the openings.

One embodiment of the plug-in tabs, housing, and insulator assembly for providing ready access to the electrically conductive busbars of the power distribution busway system is shown generally in FIGS. 4–6. The assembly is designed to facilitate efficient manufacture and to ensure a high degree of safety by preventing inadvertent contact with the electrically conductive busbars.

The basic components of the assembly include the plurality of busbars 20, a plurality of plug-in tabs 110 formed in busbars 20, and an insulator assembly 112 for receiving tabs 110 through an aperture 114 in side channel 36 of the housing. Insulator assembly 112 includes a removable cover 115 which covers the plug-in tabs 110 when they are not in use. Cover 115 prevents any inadvertent contact with the electrically conductive plug-in tabs 110.

Figure 4A:
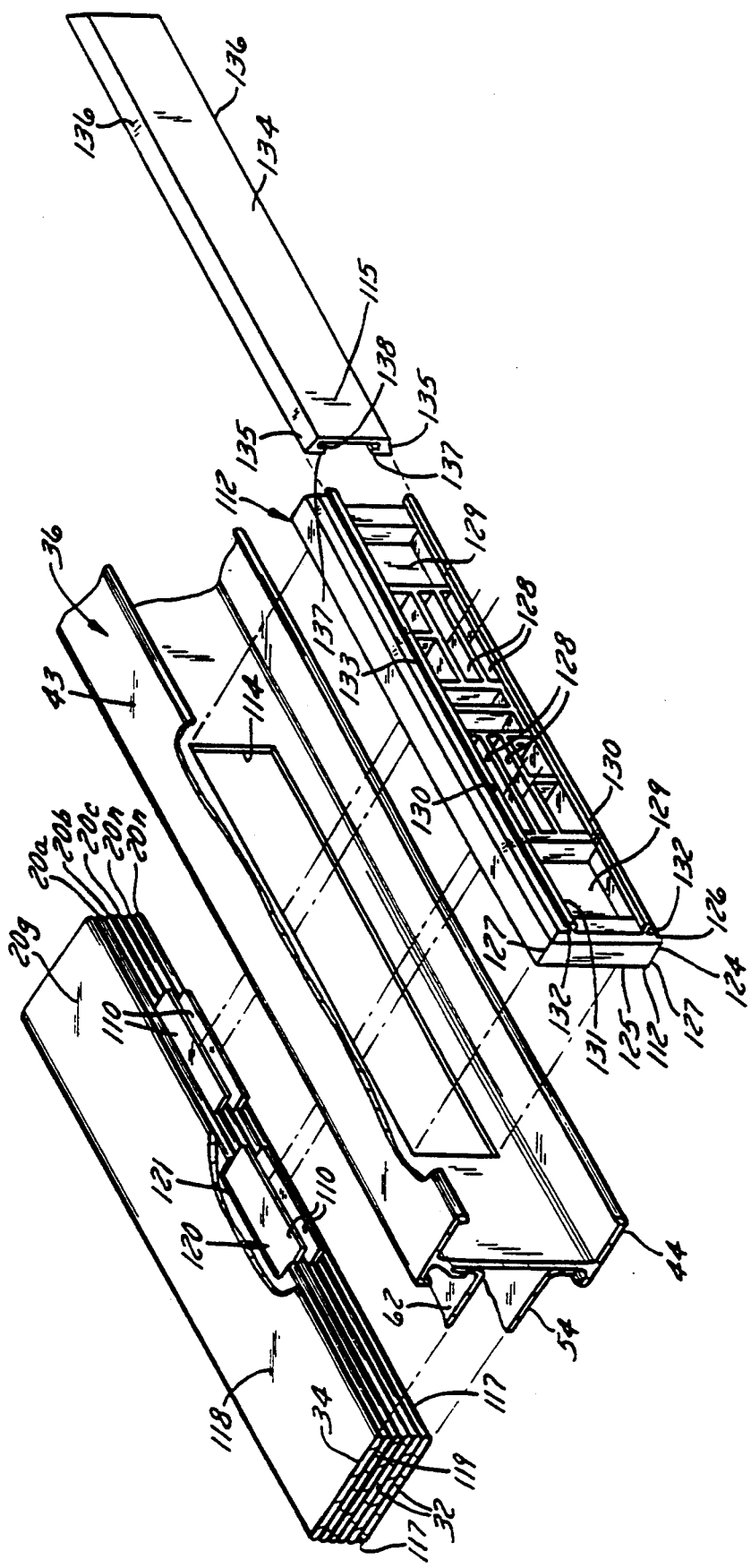
FIG. 4A is a perspective view illustrating the busbars, housing, and insulator assembly for use with staggered plug-in tabs.

Tabs 110 are formed from the conductive material of busbars 20 (See FIG. 4A). Each busbar 20 includes a bar of conductive material having a substantially rectangular cross-section, a length that varies with the length of the particular busbar section, a width defined by a pair of edges 117, and a thickness defined by a top side 118 and a bottom side 119. Each bar of conductive material 32 is coated by insulating layer 34 which insulates the busbars 20 from one another when stacked together. Plug-in tabs 110 are preferably formed in the conductive bar 32 along the length of the bar at one or both edges 117. Each plug-in tab 110 is formed at a given location 120.

In forming each tab 110, the bar of conductive material 32 is press-formed perpendicular to the top and bottom sides 118 and 119 to displace the conductive material outwardly from edge 117 at the plug-in tab location 120. This provides a tab 110 having a thickness which is less than the thickness of the busbar 20. Such press forming leaves at least one depression 121 in the conductive bar 32 and often the depression 121 includes a pair of depressions formed in top side 118 and bottom side 119. The volume of the depression 121 formed at each location 120 is equal to the volume of the material comprising the plug-in tab 110. Although the depressions and tabs could be formed in a variety of ways such as machining the depressions and attaching each tab or molding the depressions and tabs, the inventors have found that press forming depressions 121 and plug-in tabs 110 is the most efficient process.

The insulating layer 34 may be removed prior to press forming or after. Alternatively, layer 34 can be applied to busbar 20 after a tab 110 is formed.

Figure 4B:
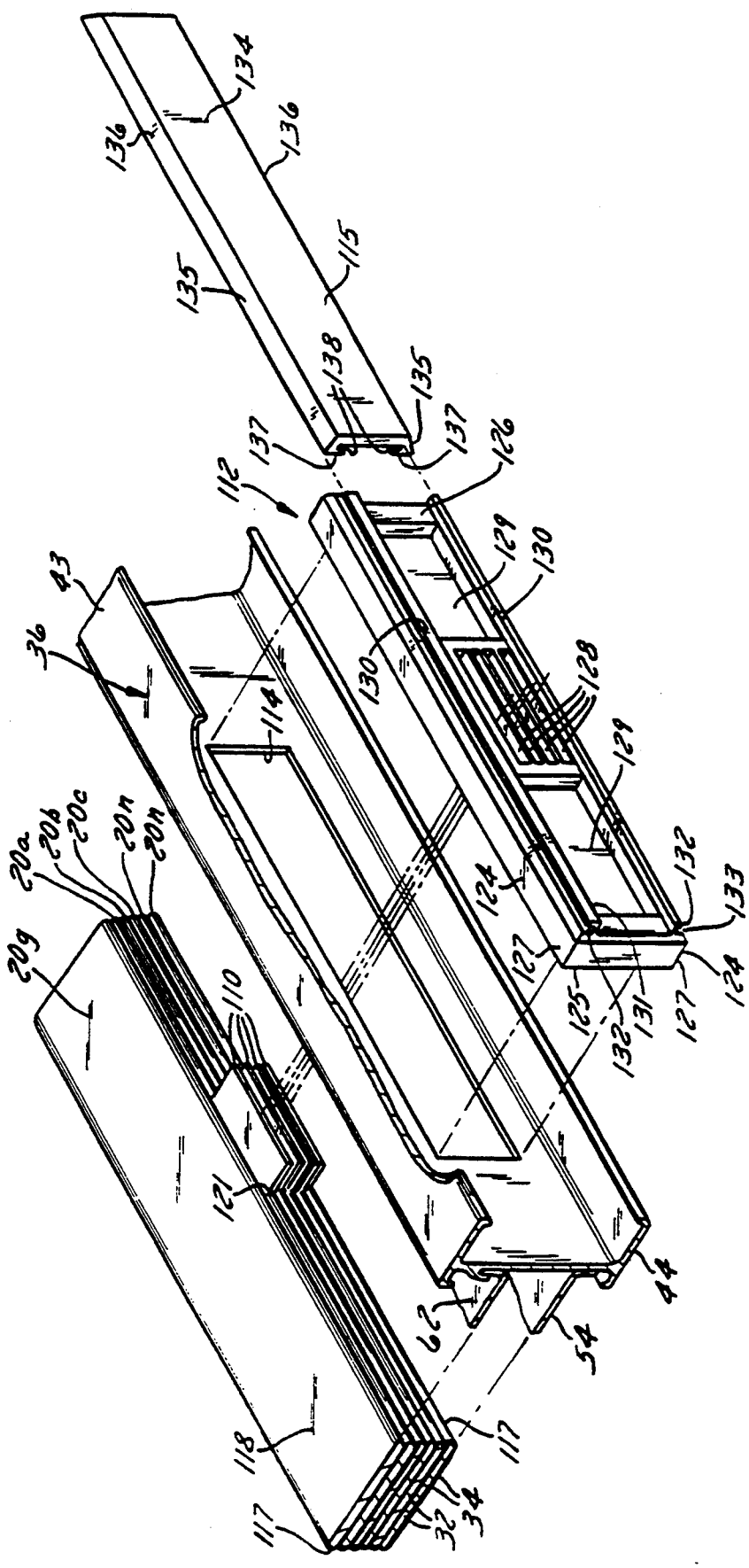
FIG. 4B is a perspective view illustrating the busbars, housing, and insulator assembly for use with stacked plug-in tabs.

Depending on the particular application, the plug-in tabs 110 may be arranged in a staggered orientation as shown in FIG. 4A, or in a stacked orientation as shown in FIG. 4B. In the stacked orientation, busbars 20 are arranged so that each plug-in tab 110 is positioned in general alignment with the other tabs 110 positioned above or below it. In the staggered orientation, the tabs are not vertically aligned and typically at least one tab will be disposed at a lengthwise spaced distance from the other tabs at that particular power tap-off section. One advantage of the staggered orientation is that it provides longer distances between tabs 110, thus reducing the risk of arcing between conductors in high voltage applications.

Regardless of the orientation, plug-in tabs 110 extend into opening 114 and cooperate with insulator assembly 112. The insulator assembly 112 is designed to limit access to plug-in tabs 110 and also to provide insulation between tabs 110, thereby reducing the risk of arcing between tabs. Insulator assembly 112 may be attached to side channel 36 by adhesive, bolts, or other ways known to those of ordinary skill in the art. In the alternative, insulator assembly could be attached directly to the busbars 20, or configured to snap into engagement with a channel 36.

Plug insulator assembly 112 includes an insulator base 124 having an inside surface 125 disposed towards side channel 36 and an outside surface 126 disposed opposite inside surface 125. The width of insulator assembly 112 is defined by a pair of edges 127 which fit between upper flange 43 and lower flange 44 of side channel 36. A plurality of openings 128 extend through the thickness of plug insulator assembly 112 generally perpendicular to inside surface 125 and outside surface 126. Each opening 128 is disposed so that it will be in proximity to at least one of the plug-in tabs 110 when plug insulator assembly 112 is installed adjacent side channel 36. This arrangement facilitates access to tabs 110. The particular configuration of openings 128 depends on the arrangement of plug-in tabs 110. For instance, if plug-in tabs 110 are located in a stacked arrangement, openings 128 will be arranged in a corresponding stacked configuration as shown generally in FIGS. 4B and 6B. If the plug-in tabs 110 are arranged in a staggered configuration, the openings 128 will be formed through insulator assembly 112 to generally match the staggered configuration of the plug-in tabs as illustrated generally in FIGS. 4A and 6A. Other depressions or openings 129 may be formed in plug insulator assembly 112 to conserve material or decrease weight.

Additionally, insulator assembly 112 includes a track structure, preferably a pair of parallel track members 130, which are attached to insulator base 124 and extend outwardly from outside surface 126. In alternate embodiments, the track member could comprise single or multiple tracks and the track member could be located in other areas, for example, along edges 127 or even recessed in insulator base 124.

Each track member 130 includes a base extension 131 which extends from insulator base 124 and a flange portion 132 that extends outwardly, i.e. transversely to extension 131. This creates a base channel 133 formed between the flange portion 132 and the outside surface 126. Various other configurations of track members 130 could also be used for slidably receiving cover 115.

As illustrated in FIGS. 4A and 4B, track members 130 are configured to slidably receive cover 115. Cover 115 is preferably flexible enough so that it can either be slid onto track members 130 or snapped over track members 130. In any event, cover 115 must be configured to cover openings 128 when plug-in tabs 110 are not in use to prevent moisture or dirt build-up in openings 128 and also to prevent inadvertent contact with tabs 110.

Cover 115 includes a planar wall 134 which covers openings 128 and a cover track member, preferably a pair of cover track members 135 configured for mating engagement with track members 130 of insulator base 124. Preferably, cover 115 includes a pair of tapered walls 136 which extend from planar wall 134 along each of its longitudinal edges. As best illustrated in FIGS. 5A–5C, a cover flange 137 extends inwardly from each tapered wall 136 generally parallel to planar wall 134 to form a cover channel 138. When cover 115 is attached to plug insulator base 124, cover flanges 137 are received in base track channels 133 and flange portions 132 are received in cover channels 138. This configuration provides an interlocking arrangement between cover 115 and insulator base 124 that allows cover 115 to be slid back and forth along the length of plug insulator base 124. It also allows cover 115 to be snapped over track flange portions 132 when the cover is attached to the insulator base.

Insulator base 124 and cover 115 may also be formed with interfering stop members (not shown) which prevent a user from inadvertently sliding cover 115 off track members 130 when the cover is moved to allow access to plug-in tabs 110. Additionally, cover 115 may also be equipped with a locking member (not shown) to lock the cover in a closed position so that a user cannot inadvertently expose conductive tabs 110. For example, the locking mechanism could comprise a screw which extends through a hole in cover 115 before being threaded into a receiving bore disposed in insulator base 124.

By way of modification, insulator assembly 112 may be configured such that cover 115 is hinge-mounted rather than track-mounted. In this configuration a rubber seal would be located at the interface between base 124 and cover 115 to provide proper moisture protection.

The plug insulator assembly 112 may also include a plurality of insulator stabs 144 extending from inside surface 125 of insulator base 124. The insulator stabs 144 are configured to slide between plug-in tabs 110 and into depressions 121. Preferably, the insulator stabs fill a substantial portion of depressions 121 to prevent arcing between the busbars where their conductive material is exposed from layer 34. Accordingly, the insulator stabs are made thicker or thinner depending on whether they are used with plug-in tabs in a stacked formation or in a staggered formation. In the stacked formation, a depression 121 in one busbar may be disposed adjacent the depression 121 of an adjacent busbar. This leaves a wider space to be filled by the insulator stab, thus requiring a thicker stab 144 (see FIG. 5B). However, if the plug-in tabs 110 are staggered, the depressions 121 of adjacent busbars are separated and only thinner insulator stabs 144 are required as shown generally in FIG. 5A.

A variety of insulative materials such as polypropylene may be used in the construction of plug insulator assembly 112 and cover 115. In some applications, it may be advantageous to construct the cover from a different material than that of the plug insulator base 124, but it is important that each component material has sufficient electrical insulative qualities to prevent any stray current or arcing. The cover 115 must also remain easy to move from its position blocking access to plug-in tabs 110. This facilitates ease of connection between electrical plug contacts 145 of the plug connector and tabs 110 as illustrated in FIG. 5C. The material of insulator base 124 must also be appropriately formed so openings 128 are properly aligned with the plug-in tabs 110 to ensure that contacts 145 slide into contact with the correct busbars.

Plug contacts 145 each include a conductor 200, a pair of contact members 202 and a pair of spring members 204. Each member 202 is fastened to a conductor 200 so that it is cantilevered over the end 206 of the associated conductor 200. To increase the contact pressure between contact members 202 and tabs 110, members 202 are fastened to conductor 200 between spring members 204 and conductor 200. Fasteners 198, such as rivets, may be used to hold the assembly 145 together.

Figure 8A:
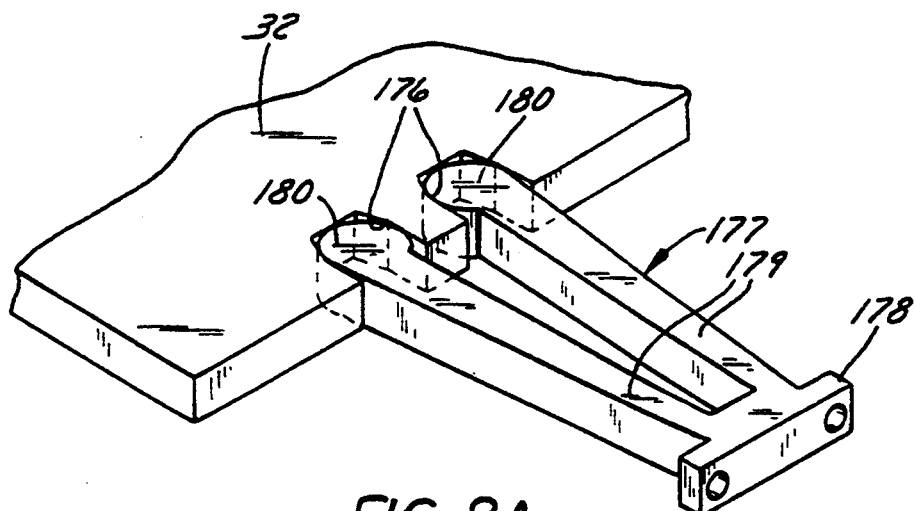
FIG. 8A shows an alternate embodiment of a busbar plug-in section.
Figure 8B:
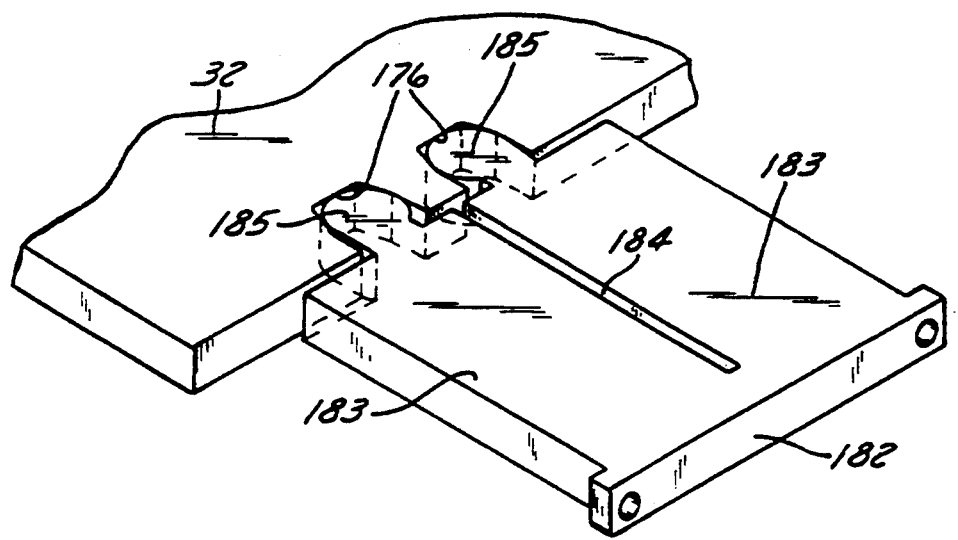
FIG. 8B shows a second alternate embodiment of a busbar plug-in section.

In FIGS. 8A and 8B, alternate devices are shown for making the connection to conductive busbars. In each embodiment, the conductive bar 32 is formed with a pair of cut-out slots 176 extending through its thickness. In the first embodiment, a connector assembly 177 is configured for insertion into the pair of cut-out slots 176. Connector assembly 177 includes a base portion 178 configured for attachment to a device requiring electrical power. The connector assembly further includes a pair of legs 179 which extend from base portion 178 and slightly diverge towards cut-out slots 176. Each leg includes an expanded portion 180 at its end opposite base 178. The expanded portions are configured and appropriately sized for an interference fit when inserted into cut-out slots 176.

Similarly, an alternate embodiment as shown in FIG. 8B includes a rectangular base 182 and two rectangular extensions 183 extending from base 182 and separated by a narrow slot 184. Disposed at the end of each rectangular extension 183 opposite base 182 is a circular portion 185 similarly configured to expanded portions 180 and designed for insertion into cut-out slots 176.

Referring back to FIG. 1, T-section 26 may be fabricated as a one-piece unit, or may be fabricated by connecting a busway section to tabs 110. More specifically, the end of a busway section could be modified such that conductors 190 of contacts 145 are replaced with busbars 20, thereby permitting one busway to be electrically connected to a perpendicular busway.

Figure 7A:
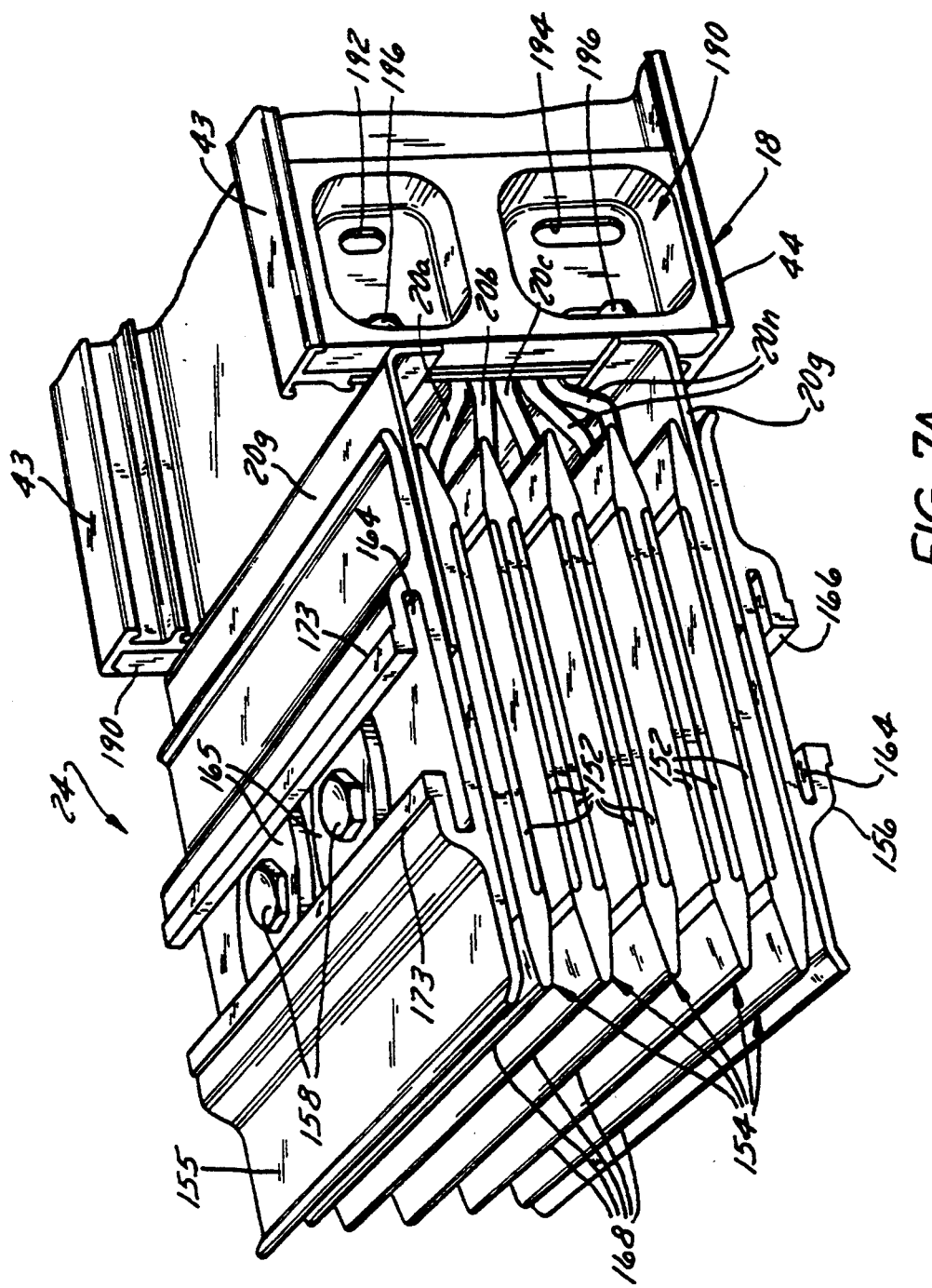
FIG. 7A is a perspective view of a joint assembly used to connect busway sections.
Figure 7B:
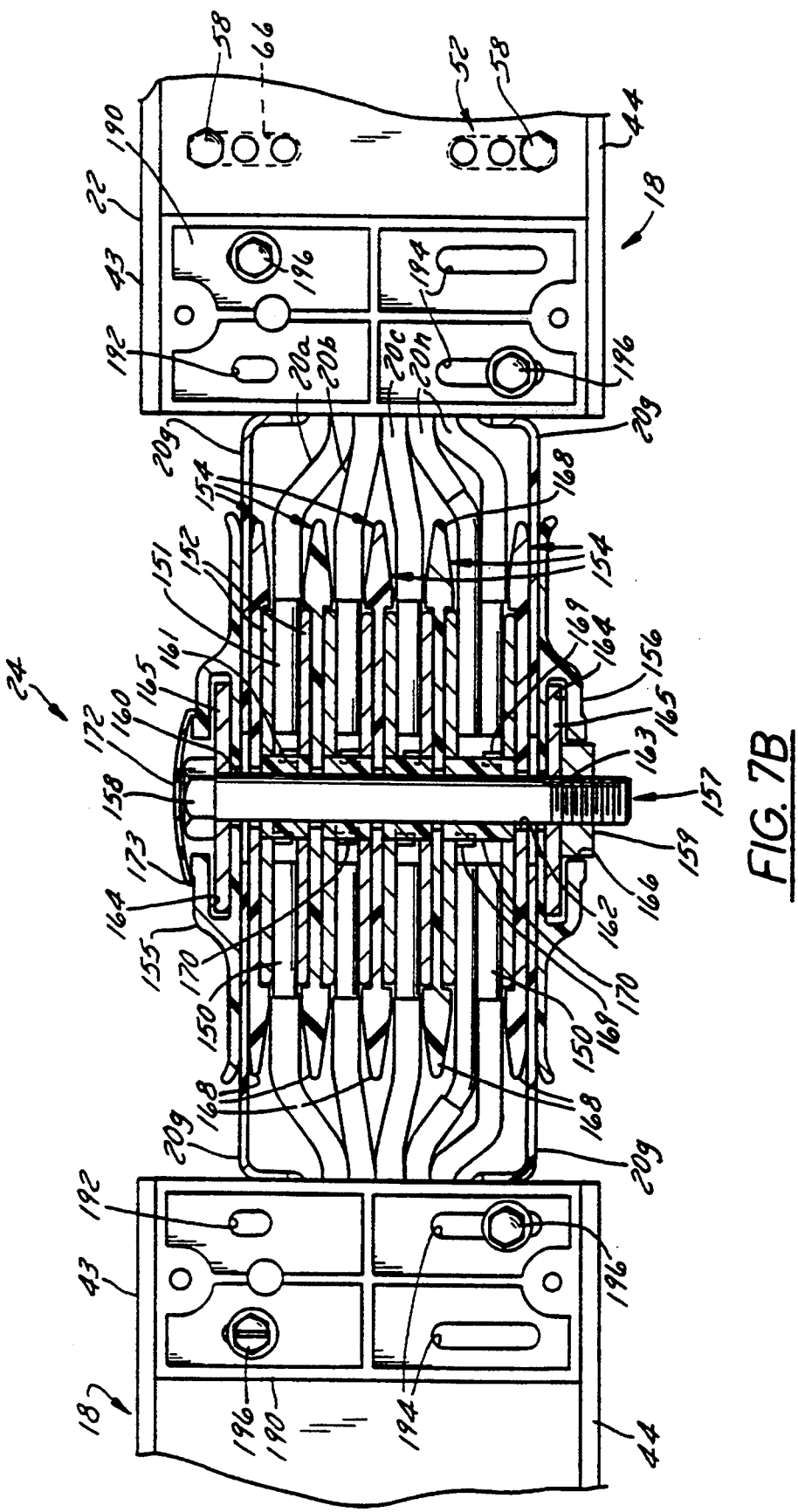
FIG. 7B is a cross-sectional view of the joint assembly.

Referring now to FIGS. 7A and 7B, a cross-sectional view of busway joint 24 is illustrated. Joint 24 is used to connect the busbars of one busway section to the busbars of another busway section so that electrical power may flow from section to section. Extending from each busway section is a plurality of busbar ends 150, 151 which are received in busway joint 24. Busbar ends 150, 151 have a portion of their insulative layers 34 removed to facilitate conduction of electrical current through busway joint 24 to the next adjacent busway section. In this example, busway joint 24 connects busway section 18 to busway section 22 (as shown in FIG. 1).

Joint 24 includes a plurality of rectangular conductive connector plates 152 which conduct electricity between busbar ends 150 of busway section 18 and corresponding busbar ends 151 of busway section 22. In other words, each busbar end 150 has a corresponding busbar end 151 electrically connected to it via a connector plate 152, and preferably two cooperating connector plates 152, pressed into electrical contact with the corresponding busbar ends 150 and 151. As shown in the illustrated embodiment, cooperating connector plates 152 are pressed against the busbar ends on both the top and bottom of each end. By way of example, plates 152 may be fabricated from extruded aluminum.

A rectangular (e.g. square) pultrusion formed insulator 154 is disposed between each adjacent pair of connector plates 152 to ensure that electric current flow is restricted to flow between the appropriate corresponding busbar ends 150 and 151. In this configuration, the ordering of the components is generally as follows: insulator 154, connector plate 152, corresponding busbar ends 150 and 151, connector plate 152, insulator 154, connector plate 152, corresponding busbar ends 150 and 151, connector plate 152, etc.

The insulators 154, connector plates 152, and busbars 150 and 151 are squeezed firmly together between a rectangular top end cap 155 and a rectangular bottom end cap 156 to ensure a low resistance electrical connection. In the preferred embodiment, end caps 155 and 156 are held together by fasteners 157 which preferably comprise bolts 158 and nuts 159. Bolts 158 extend through the center of joint 24 passing through holes 160 in top end cap 155, a plurality of holes 161 formed through connector plates 152, a plurality of holes 162 formed through the insulators 154, and a hole 163 in bottom end cap 156. Top end cap 155 and bottom end cap 156 each include an annular slot 164 which receives and contains a washer 165. Washers 165 are contained between the head of the bolt 158 and nut 159 so that as bolt 158 is tightened, washers 165 move top end cap 155 and bottom end cap 156 towards each other, thereby tightening joint 24. In the preferred embodiment, nuts 159 are held in an aperture 166 of bottom end cap 156 which is appropriately sized to prevent the nut from rotating when bolt 158 is tightened.

End caps 155 are fabricated from sections of extruded aluminum so that they may be cut from the sections on an as-needed basis.

Insulators 154 each include a substantially flat body portion 155 which extends between a pair of tapered ends 168 (full or partial arrowhead shaped cross-section) which extend beyond connector plates 152. The tapered ends facilitate the insertion of busbar ends 150 and 151 into joint 24. Additionally, the tapered ends 168 provide a greater electrical over-surface distance to reduce the chance of current travel or arcing between adjacent busbar ends or connector plates. Insulators 154 are referred to as pultrusion insulators since they may be fabricated from continuous sections of a glass-filled polyester manufactured with a pultrusion process. More specifically, insulators 154 are cut from a continuous pultrusion section having a cross-section as illustrated in FIG. 7B. The manufacture of insulators 154 from sections fabricated from the pultrusion formed material reduces inventory costs since insulators 154 may be efficiently produced by cutting them from the sections on an as-needed basis.

Insertion of the busbar ends is further facilitated by a plurality of spacer tabs 169 which extend from connector plates 152 in proximity to bolt 158. In the present embodiment, tabs 169 are simultaneously stamped or press-formed with holes 161 in plates 152. Tabs 169 are typically formed from a portion of the material which would be removed to form holes 161. Tabs 169 are substantially rectangular and bent at about a 90° angle to the plate. The use of tabs 169 provides for an integral plate 152 and spacing arrangement which reduced manufacturing and assembly costs. The spacer tabs 169 are configured to extend toward adjacent cooperating connector plates 152 so the plates are held apart prior to insertion of busbar ends 150 or 151. Thus, there is less obstruction when the busbar ends are inserted into the joint. By way of example, a tab length greater than 50% of the respective busbar thickness is preferable. However, the spacer tabs cannot be so long as to prevent the connector plates 152 from being tightened into firm electrical contact with the busbar ends.

Spacer tabs 169 also prevent busbar ends 150, 151 from contacting bolt 158. This is particularly advantageous when bolt 158 is electrically insulated by neopine grommets (insulative sleeve) 170 since insertion of the ends could damage grommets 170. Grommets 170 operates to insulate bolt 158 from plates 152. When joint 24 is assembled, grommets 170 are compressed to provide a seal between plates 152 to prevent phase-to-phase over-surface and through-air creepage. In addition to grommets 170, a Lexan sleeve (not shown) may be positioned about bolt 158 along all or part of the non-threaded portion of bolt 158. The Lexan sleeve is further provided to insulate bolt 158 from plates 152 and the busbars.

Joint 24 also includes a water seal cover 172 which preferably snaps onto ridges 173 formed in top end cap 155. Water seal cover 172 is disposed over bolt 158 and prevents dirt or moisture from passing into joint 24 along bolt 158. Joint 24 may also include a pair of ground busbars 20g which extend between busway sections 18 and 22 to ensure proper grounding between sections 18. A second water seal cover (not shown) could be provided to cover the threaded end of bolt 157.

Referring to FIGS. 6A, 6B, 7A and 7B, sections 18 each include 4 end blocks 190. Two blocks 190 are mounted between flanges 43 and 44 at each end of a section 18 adjacent to a joint 24. Blocks 190 are cast from a material such as aluminum, and provide structural strengthening at the ends of sections 18. Blocks 190 include upper and lower slots 192 and 194 to accommodate the variable channel 47 and 54 spacings, and are fastened between flanges 43 and 44 with fasteners 196 (bolts).

It will be understood that the foregoing description is of preferred exemplary embodiments of this invention, and the invention is not limited to the specific forms shown. For example, the conductive plug-in tabs may have various shapes and configurations, the housing channels may have different configurations depending on the particular application, the insulator assembly openings may be arranged differently depending on the arrangement and style of the plug-in tabs, and the sliding cover may be attached to the insulator assembly by various configurations of track members. By way of another example, the fasteners for joining the channels to the side plates may include rivets, proper adhesives and weldings (e.g. spot, stick, wire, resistive, ultrasonic). These and other modifications may be made in the design and arrangement of the elements without departing from the scope of the invention as expressed in the appended claims.

What is claimed is:

1. An electrical power distribution busway comprising:
   a first conductive busbar;
   a second conductive busbar;
   a pair of substantially parallel side plates;
   a top housing channel adjustably mounted between the side plates;
   a bottom housing channel adjustably mounted between the pair of side plates, wherein the top and bottom housing channels may be adjusted towards and away from each other such that the first and second busbars are held in contact with each other between the top and bottom housing channels;
   a plurality of fasteners for connecting the top and bottom housing channels to the side plates at a plurality of connection points, wherein the fasteners may be loosened for adjustment of the top and bottom housing channels and tightened to secure the top and bottom channels at a desired distance from each other; and
   a plurality of gripping structures, each gripping structure being disposed at one of the connection points to prevent slippage between the channels and side plates.

2. The busway of claim 1, wherein the gripping structures comprise teeth formed in the surfaces of the channels and side plates at each connection point location.

3. An electrical power distribution busway, comprising:
a stack of at least two conductive busbars;
a pair of side plates;
a stationary housing channel mounted between the pair of side plates at a fixed location;
an adjustable housing channel adjustably fastened directly to the pair of side plates, wherein the adjustable housing channel may be adjusted towards and away from the stationary housing channel to secure the stack of conductive busbars therebetween; and
a plurality of fasteners for connecting the adjustable housing channel to the side plates at a plurality of connection points, wherein the fasteners may be loosened for adjustment of the adjustable housing channel and tightened to secure the adjustable housing channel at a desired distance from the stationary housing channel, and the stationary housing channel includes a pair of outer legs and each side plate includes a hook portion for receiving one of the outer legs.

4. The busway of claim 3, further comprising a plurality of gripping elements, each gripping element being disposed at one of the connection points to prevent slippage of the adjustable housing channel between the side plates where the adjustable housing channel is secured to the side plates.

5. The busway of claim 4, wherein the adjustable housing channel includes a pair of outer legs, each leg having an aperture for receiving one of the fasteners.

6. The busway of claim 5, wherein each side plate includes an elongate slot generally aligned with the aperture and through which the fastener extends allowing the adjustable housing channel to be adjusted and fastened at any point along the elongate slot.

7. An electrical power distribution busway housing for supporting a stack of conductive busbars, the housing comprising:
a first side channel including a plate portion having an inside surface, an outside surface, a top edge, a bottom edge, a hook extending from the inside surface and hooking downward towards the bottom edge, a plurality of elongate slots extending therethrough, and a plurality of gripping teeth in proximity to the elongate slots, the first side channel further including an upper flange attached at the top edge of the plate portion generally perpendicular to the plate portion and a lower flange attached at the bottom edge of the plate portion generally perpendicular to the plate portion;
a second side channel generally parallel to the first side channel and including a plate portion having an inside surface, an outside surface, a top edge, a bottom edge, a hook extending from the inside surface and hooking downward towards the bottom edge, a plurality of elongate slots extending therethrough, and a plurality of gripping teeth in proximity to the elongate slots, the second side channel further including an upper flange attached at the top edge of the plate portion generally perpendicular to the plate portion and a lower flange attached at the bottom edge of the plate portion generally perpendicular to the plate portion;
a top housing channel including a planar member disposed generally perpendicular to the plate portions of the first and second side channels, a pair of legs extending outward from the planar member to provide the top housing channel with a generally U-shaped configuration, the legs of the U extending towards the top edges of the plate portions, a plurality of holes extending through each leg, each hole being located for cooperation with one of the elongate slots, and a plurality of gripping teeth disposed in proximity to each hole for cooperation with the gripping teeth proximate its adjacent elongate slot;
a bottom housing channel including a planar member disposed generally perpendicular to the plate portions of the first and second side channels, a pair of legs extending outward from the planar member to provide the bottom housing channel with a generally U-shaped configuration, the legs of the U extending generally downwards towards the bottom edges of the plate portions, a plurality of holes extending through each leg, each hole being located for cooperation with one of the elongate slots, and a plurality of gripping teeth disposed in proximity to each hole for cooperation with the gripping teeth of its adjacent elongate slot; and
a plurality of bolts for connecting the side channels to the top and bottom channels, each bolt extending through an adjacent hole and elongate slot, wherein the bolts may be loosened and adjusted along the elongate slots to change the distance between the top and bottom housing channels.

8. An electrical power distribution busway comprising:
a pair of substantially parallel side plates;
a top housing channel mounted between the side plates;
a bottom housing channel mounted between the side plates opposite the top channel;
means for adjustably mounting at least one of the top and bottom housing channels to the side plates to permit adjustment of the housing channels towards and away from the opposite housing channel; and
a set of conductive busbars including three busbars supported between the top and bottom housing channels, each busbar having an insulative layer wherein the side plates are mounted to hold the insulating layers of adjacent busbars in contact, the means for adjustably mounting further comprising a plurality of bolts, wherein the side plates are configured to define a plurality of slots, and the channels are configured to define a plurality of circular openings, the openings aligning with at least a portion of one associated slot such that one bolt passes through the slot and opening, the means for adjustably mounting further comprising teeth located substantially in the vicinity of the slots and openings.

* * * * *